(12) United States Patent
Levitan et al.

(10) Patent No.: US 9,983,878 B2
(45) Date of Patent: May 29, 2018

(54) BRANCH PREDICTION USING MULTIPLE VERSIONS OF HISTORY DATA

(71) Applicant: International Business Machines Corporation, Armonk, NY (US)

(72) Inventors: David S. Levitan, Austin, TX (US); Jose E. Moreira, Irvington, NY (US); Mauricio J. Serrano, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 14/278,000

(22) Filed: May 15, 2014

(65) Prior Publication Data
US 2015/0331691 A1     Nov. 19, 2015

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/30149* (2013.01); *G06F 9/3848* (2013.01); *G06F 9/3861* (2013.01)

(58) Field of Classification Search
CPC .................................................. G06F 9/3806
USPC ....................................................... 712/240
See application file for complete search history.

(56) References Cited

U.S. PATENT DOCUMENTS

| | | | |
|---|---|---|---|
| 5,935,241 A | 8/1999 | Shiell et al. | |
| 6,745,323 B1 * | 6/2004 | Sinharoy | G06F 9/3848 712/233 |
| 7,000,096 B1 * | 2/2006 | Sinharoy | G06F 9/3861 712/239 |
| 7,243,219 B2 * | 7/2007 | Jourdan | G06F 9/3848 712/239 |
| 7,689,816 B2 | 3/2010 | Levitan | |
| 2005/0027975 A1 * | 2/2005 | Frommer | G06F 9/3863 712/240 |
| 2008/0072024 A1 | 3/2008 | Davis et al. | |

(Continued)

OTHER PUBLICATIONS

A. Seznec and P. Michaud. A case for (partially)-tagged gemotric history length predictors. Journal of Instruction Level Parallelism, Apr. 2006.*

(Continued)

*Primary Examiner* — Aimee Li
*Assistant Examiner* — Michael Metzger
(74) *Attorney, Agent, or Firm* — Peter J. Edwards

(57) ABSTRACT

Branch prediction is provided by generating a first index from a previous instruction address and from a first branch history vector having a first length. A second index is generated from the previous instruction address and from a second branch history vector that is longer than the first vector. Using the first index, a first branch prediction is retrieved from a first branch prediction table. Using the second index, a second branch prediction is retrieved from a second branch prediction table. Based upon additional branch history data, the first branch history vector and the second branch history vector are updated. A first hash value is generated from a current instruction address and the updated first branch history vector. A second hash value is generated from the current instruction address and the updated second branch history vector. One of the branch predictions are selected based upon the hash values.

16 Claims, 6 Drawing Sheets

(56) References Cited

U.S. PATENT DOCUMENTS

| | | | |
|---|---|---|---|
| 2008/0307210 A1 | 12/2008 | Levitan et al. | |
| 2009/0037708 A1 | 2/2009 | Park et al. | |
| 2009/0125707 A1* | 5/2009 | Olson | G06F 9/3848 712/240 |
| 2009/0198983 A1* | 8/2009 | Levitan | G06F 9/3848 712/240 |
| 2010/0037036 A1* | 2/2010 | Hum | G06F 9/3844 712/205 |
| 2010/0169626 A1* | 7/2010 | Wang | G06F 9/3848 712/239 |
| 2013/0332713 A1 | 12/2013 | Bonanno et al. | |
| 2015/0032997 A1 | 1/2015 | Eickemeyer et al. | |
| 2015/0046691 A1 | 2/2015 | Heil et al. | |
| 2015/0331691 A1 | 11/2015 | Levitan et al. | |
| 2015/0363203 A1 | 12/2015 | Lipasti et al. | |
| 2016/0026470 A1 | 1/2016 | Manoukian | |

OTHER PUBLICATIONS

Michaud, P., "A PPM-like, tag-based branch predictor," Journal of Instruction-Level Parallelism 7, Published Apr. 2005, pp. 1-10, http://www.jilp.org/vol7/v7paper10.pdf.

Michaud et al., "A Comprehensive Study of Dynamic Global History Branch Prediction," National Institute for Research in Computer Science and Control, No. 4219, Jun. 2001.

Sazeides et al., "Improving Branch Prediction by considering Affectors and Affectees Correlations," Transactions on high-performance embedded architectures and compilers III, Jan. 1, 2011, pp. 69-88, Springer-Verlag Berlin, Heidelberg ©2011 ISBN: 978-3-642-19447-4.

Seznec, A., "The L-TAGE Branch Predictor," Journal of Instruction-Level Parallelism 9, Published May 2007, pp. 1-13, http://www.jilp.org/vol9/v9paper6.pdf.

Seznec, A., "A 64-Kbytes ITTAGE indirect branch predictor," 2011, pp. 1-4, http://www.jilp.org/jwac-2/program/cbp3_07_seznec.pdf.

Srinivasan et al., "An Idealistic Neuro-PPM Branch Predictor," Journal of Instruction-Level Parallelism 9, Published May 2007, pp. 1-13.

Levitan et al., "Branch Prediction Using Multiple Versions of History Data", U.S. Appl. No. 15/096,407, filed Apr. 12, 2016.

List of IBM Patents or Patent Applications Treated as Related, Apr. 11, 2016, 2 pages.

U.S. Appl. No. 15/096,407 , Accelerated Examination Support Document, dated Apr. 6, 2016, 15 pages.

Levitan et al., "Branch Prediction Using Multiple Versions of History Data", U.S. Appl. No. 15/342,139, filed Nov. 3, 2016.

Levitan et al., "Branch Prediction Using Multiple Versions of History Data", U.S. Appl. No. 15/342,141, filed Nov. 3, 2016.

U.S. Appl. No. 15/342,139, Accelerated Examination Support Document, dated Oct. 27, 2016, 17 pages.

U.S. Appl. No. 15/342,141, Accelerated Examination Support Document, dated Oct. 27, 2016, 17 pages.

IBM, List of IBM Patents or Patent Applications Treated as Related, Nov. 1, 2016, 2 pages.

\* cited by examiner

BRANCH PREDICTION USING MULTIPLE VERSIONS OF HISTORY DATA

BACKGROUND

The present disclosure relates to branch prediction in computer processors, and more specifically, to specific uses of history data in branch prediction.

Many computer processor circuits use instruction pipelines to increase the number of instructions that can be executed in a unit of time. The execution of a single instruction can be separated in to a series of divisible operations that form a pipeline. Accordingly, multiple instructions can be in various stages of execution at the same time. When a conditional branch instruction is encountered, the computer processor may not be able to know for certain what instructions will be executed next because the condition for branching may not be known at the time the branch instruction is loaded into the pipeline. Branch prediction techniques can be used to guess whether or not the conditional branch will be taken, before it is known for certain. Good branch prediction can reduce the delays that are caused by having to back out partially executed instructions loaded due to an incorrect branch prediction.

SUMMARY

Consistent with embodiments, a method is implemented for providing branch prediction. A first index is generated from a previous instruction address and from a first branch history vector having a first length. A second index is generated from the previous instruction address and from a second branch history vector having a second length that is longer than the first length. Using the first index, a first branch prediction is retrieved from a first branch prediction table retrieving. Using the second index, a second branch prediction is retrieved from a second branch prediction table. Based upon additional branch history data, the first branch history vector and the second branch history vector are updated. A first hash value is generated from a current instruction address and the updated first branch history vector. A second hash value is generated from the current instruction address and the updated second branch history vector. One of the first branch prediction and the second branch prediction are selected based upon the first and second hash values.

Various embodiments are directed toward a branch prediction device that includes a first branch prediction path. The first branch prediction path includes a first index generation circuit that is configured to generate a first index from a previous instruction address and from a first branch history vector having a first length. A first branch prediction table is configured to provide a first branch prediction and a first tag value based upon the first index. A first verification circuit is configured to generate a first hash value from a current instruction address and from an updated version of the first branch history vector; and verify the first branch prediction by comparing the first tag value to the first hash value. A second branch prediction path includes a second index generation circuit configured to generate a second index from the previous instruction address and from a second branch history vector having a second length. A second branch prediction table that is configured to provide a second branch prediction and a second tag value based upon the second index. A second verification circuit is configured to generate a second hash value from the current instruction address and from an updated version of the second branch history vector; and verify the second branch prediction by comparing the second tag value to the second hash value. A selection circuit is configured to select between the first and second branch prediction paths in response to the first and second verification circuits.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
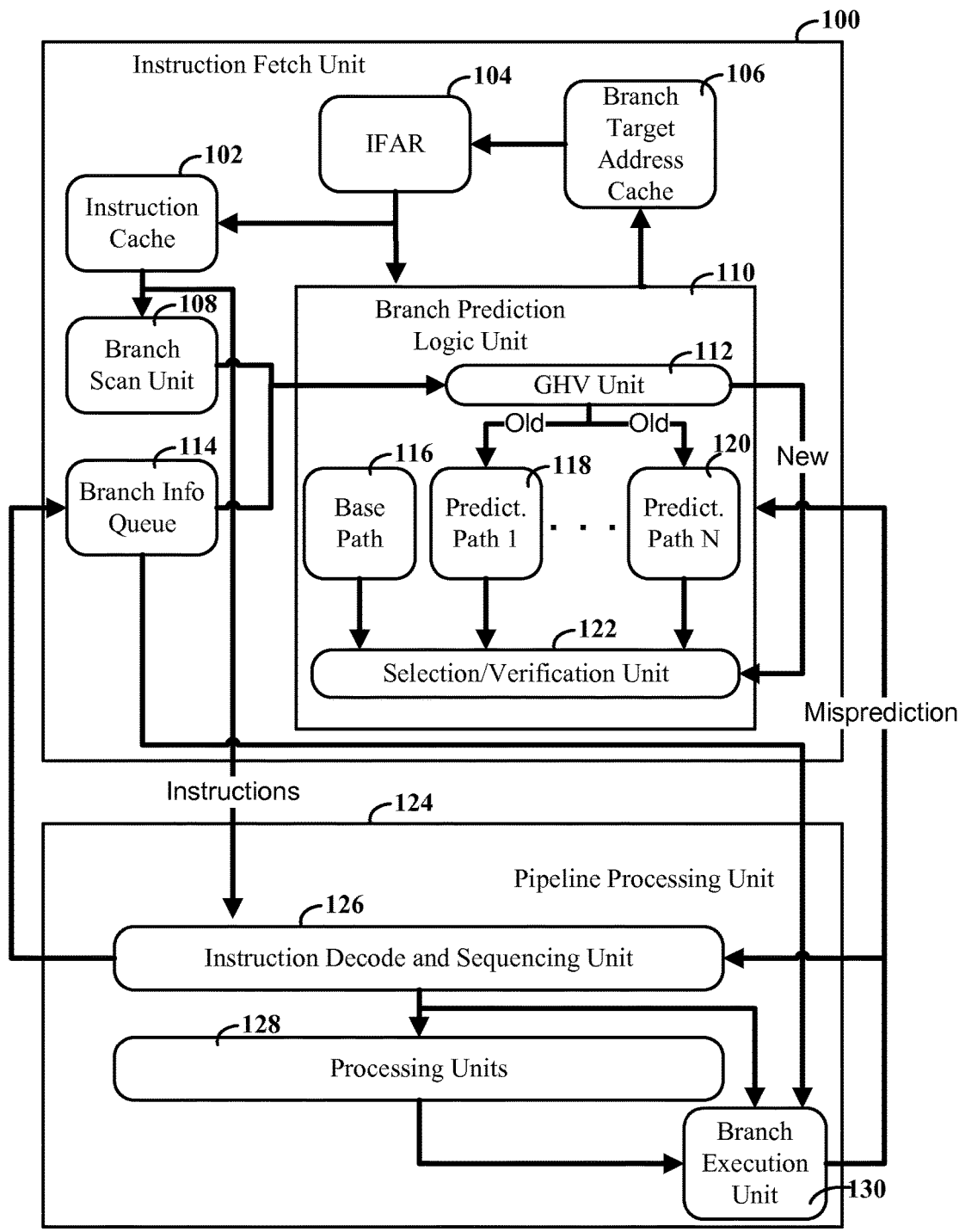
FIG. 1 depicts a block diagram of a processor circuit with branch prediction, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to branch prediction in computer processors, and more particular aspects relate to how different versions of history data can be used in branch prediction. While the present disclosure is not necessarily limited to such applications, various aspects of the disclosure may be appreciated through a discussion of various examples using this context.

Embodiments of the present disclosure are directed toward branch prediction circuits that use branch history data to dynamically update how predictions are generated. Various aspects are directed toward a branch predictor circuit that is designed to use global history vector (GHV) to generate the predictions. Particular aspects are directed toward a branch predictor that can be configured to use two versions of branch history data, one that has been updated with recent branch history and one that has not. This can be particularly useful for avoiding latency associated with accessing predictor tables using updated/recent branch history.

Consistent with embodiments, global branch prediction can be used to make a branch prediction based upon a history of past branch decisions. Particular embodiments can use a vector that stores values representing past branch decisions. A particular example is a GHV, which can use a vector to store branch history that is shared between multiple conditional branches. Each bit of data in the vector can be associated with a different group of instructions, with the position in the vector representing how recently the group of instructions were fetched. The GHV can be used to index into a predictor table that contains branch predictions. The GHV and the predictor table can be continually updated based upon whether or not conditional branches have been taken.

As discussed in more detail here, a branch prediction may be generated by creating an index from the GHV and the program counter (PC). The process of generating the index and then using the index to access a predictor table may require a non-trivial amount of time. This can result in instructions that rely upon the branch prediction being delayed by one or more instruction cycles. Accordingly, various embodiments allow for the generation of the index using an older version of the GHV and PC. A corresponding older version of the predictor table can also be used. This allows for the time required to generate index, and to access the predictor table, to be hidden by beginning the generation and access process earlier (e.g., before updated data is available).

Turning now to the figures, FIG. 1 depicts a block diagram of a processor circuit with branch prediction, consistent with embodiments of the present disclosure. The processor circuit of FIG. 1 can include an instruction fetch unit 100. An instruction fetch address register (IFAR) 104 can store the address of a current instruction. An instruction cache 102 can temporarily store instructions fetched from memory. The instruction fetch unit 100 can also include a branch scan logic unit 108 that can scan cache lines of instructions in the instruction cache 102 to identify branch instructions. Detected branch instructions can be routed to branch prediction logic unit 110. A branch info queue 114 can store information about the detected branches.

Consistent with embodiments, a branch prediction logic unit 110 can include a GHV unit 112 that can store branch history data. In certain embodiments, the GHV can include multiple vectors, each having different history lengths that can be used in different prediction paths 118, 120. For instance, the prediction paths 118, 120 can use a respective GHV length to generate an index into a respective branch prediction table. A selection or verification unit 122 can select between predictions from the prediction paths 118, 120 based upon whether or not the data from the respective branch prediction table is a match for the particular branch instruction and GHV. A base prediction path 116 can be selected in the event that none of the prediction paths 118, 120 result in a match. The results of the prediction can be provided to branch target address cache 106 and used to identify the next instructions to load into the processor pipeline.

A pipeline processing unit 124 can process multiple instructions using processing units 128 (e.g., floating-point units, fixed-point units, and load-store units). A branch execution unit 130 can resolve conditional branch instructions and determine the path address of the execution path that should be taken. The results can be compared against the prediction of the branch prediction logic unit 110 and used to detect branch mispredictions.

Consistent with various embodiments, the branch prediction logic unit 110 can be configured to generate the branch prediction data based upon an old version of the GHV and PC, relative to the branch prediction being analyzed. This can be particularly useful for allowing the branch prediction generation process to begin before the GHV (or PC) has been updated from the previous cycle. The process of generating indexes and retrieving the branch predictions can include the application of a hash function followed by indexing into a predictor table using associative (matching) logic. This may take multiple instruction cycles to complete. The use of older, already available, data allows for the process to begin earlier. While data is being retrieved from the predictor tables, updated version of the GHV(s) and the PC become available. The updated versions can then be used to generate verification hash values. These hash values can be used by the selection or verification unit 122 to verify and select the branch predictions for each prediction path 118, 120.

When a misprediction, flush, or similar, event occurs, the old version of the GHV, PC and predictor tables may become invalid and inaccurate. Accordingly, the branch prediction logic unit 110 can be configured to modify the branch prediction process until the old versions is generated and available. In certain embodiments, this may include using the base path 116 (which does not use the GHV) for a period of time. In various embodiments, the branch prediction logic unit 110 can be configured to recreate the GHVs of different history lengths (which may be folded into smaller amounts of bits) from a stored version of the entire GHV. The branch prediction logic unit 110 can also be configured to store multiple versions of history data so that rollback is possible in the event of a misprediction.

Figure 2:
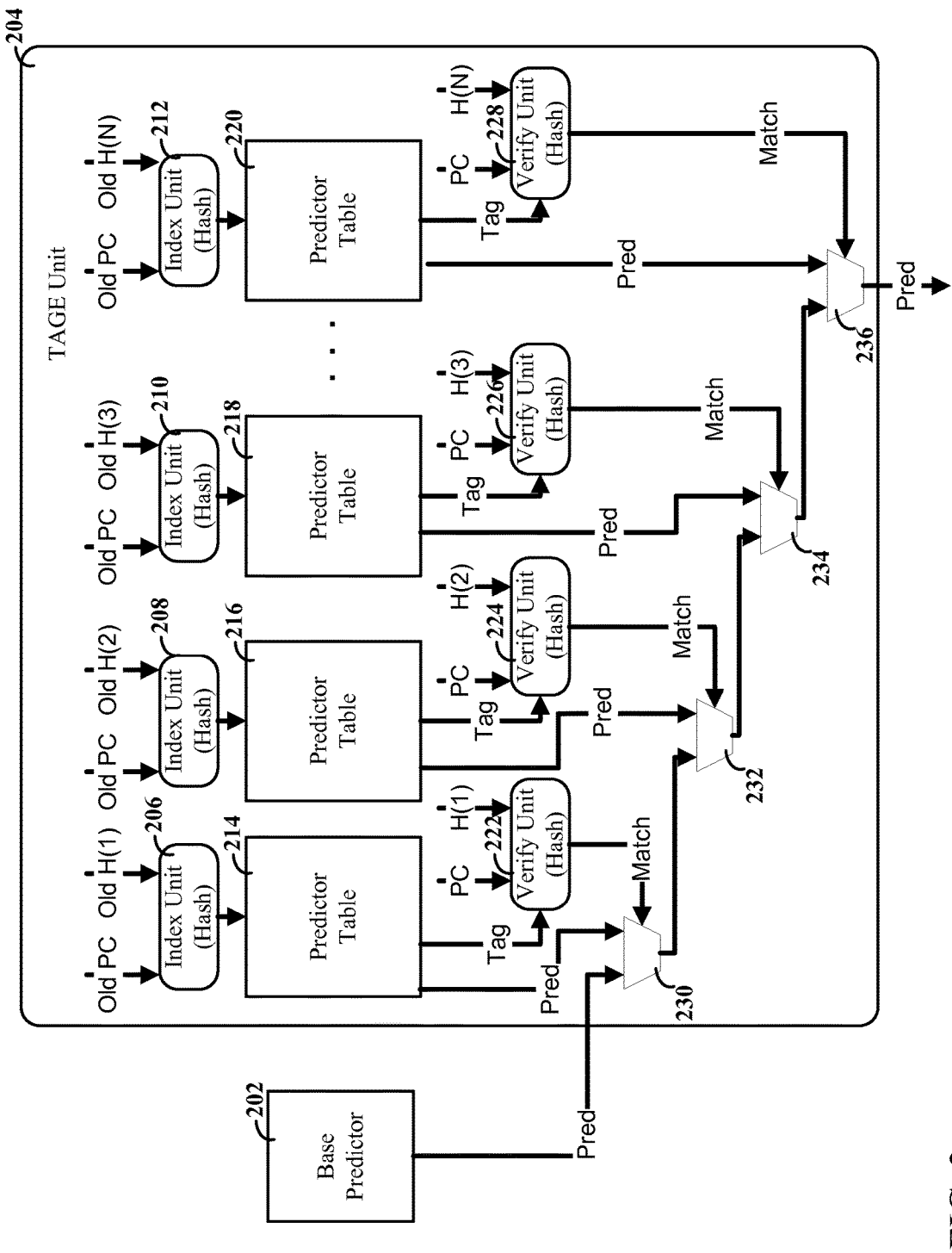
FIG. 2 depicts a block diagram of a prediction logic unit, consistent with embodiments of the present disclosure.

FIG. 2 depicts a block diagram of a prediction logic unit, consistent with embodiments of the present disclosure. The prediction logic unit (e.g., as shown in FIG. 1) can include multiple prediction paths. In certain embodiments, the branch prediction logic unit can include a tagged geometric length (TAGE) history length branch prediction unit 204. A base predictor 202 can provide a prediction that can be used if the TAGE unit 204 does not find a match for current branch or is disabled in the event of a branch misprediction, flush or similar event.

The TAGE unit 204 can include multiple paths that can each use history vectors (H(n)) of differing lengths that form a geometric series (e.g., $L(j)=\alpha^{j-1}L(1)$). TAGE prediction relies upon multiple predictor tables 214, 216, 218, 220. These predictor tables can be indexed using the old GHV (Old H(n)) and the branch address (Old PC). For example, index (generation) units 206, 208, 210, 212 can generate indexes for different history lengths of the GHV. This can allow for predictions to be based upon correlations that exist with recent branch outcomes as well as with older branch outcomes.

Consistent with embodiments, the TAGE predictor tables 214, 216, 218, 220 store a set of individually addressable entries. Each entry can include a prediction element (e.g., a signed counter) and a tag. In various embodiments, additional information can also be stored in the entries, such as a useful counter that can be used to record when a prediction of a particular branch does not match the ultimate prediction selected by the TAGE unit 204.

According to embodiments, the index (generation) units 206, 208, 210, 212 can be configured to generate a hash based upon the GHV of different lengths along with the program counter. In certain embodiments, the GHV can be generated based upon a global branch history that is based upon branches taken and a path history that is based upon address information. Based upon a corresponding index, an entry can be retrieved from a predictor table for each path. As discussed herein, the index units can generate the hash based upon data that corresponds to previous instructions (or "old" data), relative to the (current) branch instruction for which a prediction is sought. This old data can include both an old version of the GHV and an old version of the PC.

Although the old data does not match the current branch instruction, it has been discovered that indexing based upon old data can still provide good correlation to a current branch instruction. Thus, it has been discovered that checking the tag portion of an entry for a match based upon updated (or current) data can provide good prediction results. This updated data can include both a newer version of the GHV and a newer version of the PC, which can correspond to the current branch instruction. Verification (hash) units 222, 224, 226, 228 can be configured to generate a verification value based upon the updated data and to compare the verification value to the tag (which was provided based upon the old data). Verification units 222, 224, 226, 228 can apply a hash function to a newer version of the GHV (having different lengths for each path) and a newer version of the PC (or portions of the newer PC, with different lengths for different paths). If the result of the hash function matches the tag value, then the corresponding prediction can be selected using selection (e.g., multiplexing) units 230, 232, 234, 236.

As depicted, the selection process can be configured to preferentially select a matched prediction from a longer history vector over a matched prediction with a shorter history vector. Moreover, if none of the prediction paths in the TAGE unit 204 result in a match, the prediction from the base predictor 202 can be used. Consistent with various embodiments, variations in the selection logic can be used. For instance, the prediction selection can be based upon a consensus of predictions in the different paths (e.g., by giving each path with a match a vote and selecting the branch prediction with the most votes).

Consistent with various embodiments, the index units 206, 208, 210, 212 can be configured to begin generating the index value before the updated data is available. This can be particularly useful for effectively hiding the time required to generate the index value (relative to an index unit that generates an index value based upon the updated data). In particular embodiments, the base predictor 202 can be configured generate a prediction using only a few instruction (or clock) cycles (e.g., 2 or 3 cycles). Correspondingly, the TAGE unit 204 can also be configured to generate a prediction using only a few instruction cycles when measured relative to an already generated index value. The generation of an index value, however, might take one or more cycles to complete. Thus, the ability to begin generation of the index value a few cycles earlier than the updated data is available can result in a net decrease in the time required to generate a prediction.

According to embodiments, the base predictor 202 can use a number of different techniques to provide a prediction even in the absence of a match within the TAGE unit 204. For example, the base predictor 202 can use a saturating counter or bimodal predictor.

Moreover, the TAGE predictor tables 214, 216, 218, 220 can use a variety of different techniques and configurations. For example, the number of paths and tables can vary according to the particular application. Similarly, the size of various parts of the entries in the predictor tables can vary (e.g., tag width or predictor size). In some embodiments, a loop prediction component can be included as part of the branch predictor circuit. The loop prediction component can be configured to account for regular loops in which the same branch decision is made multiple times in a row. Additional variations are also possible.

Figure 3:
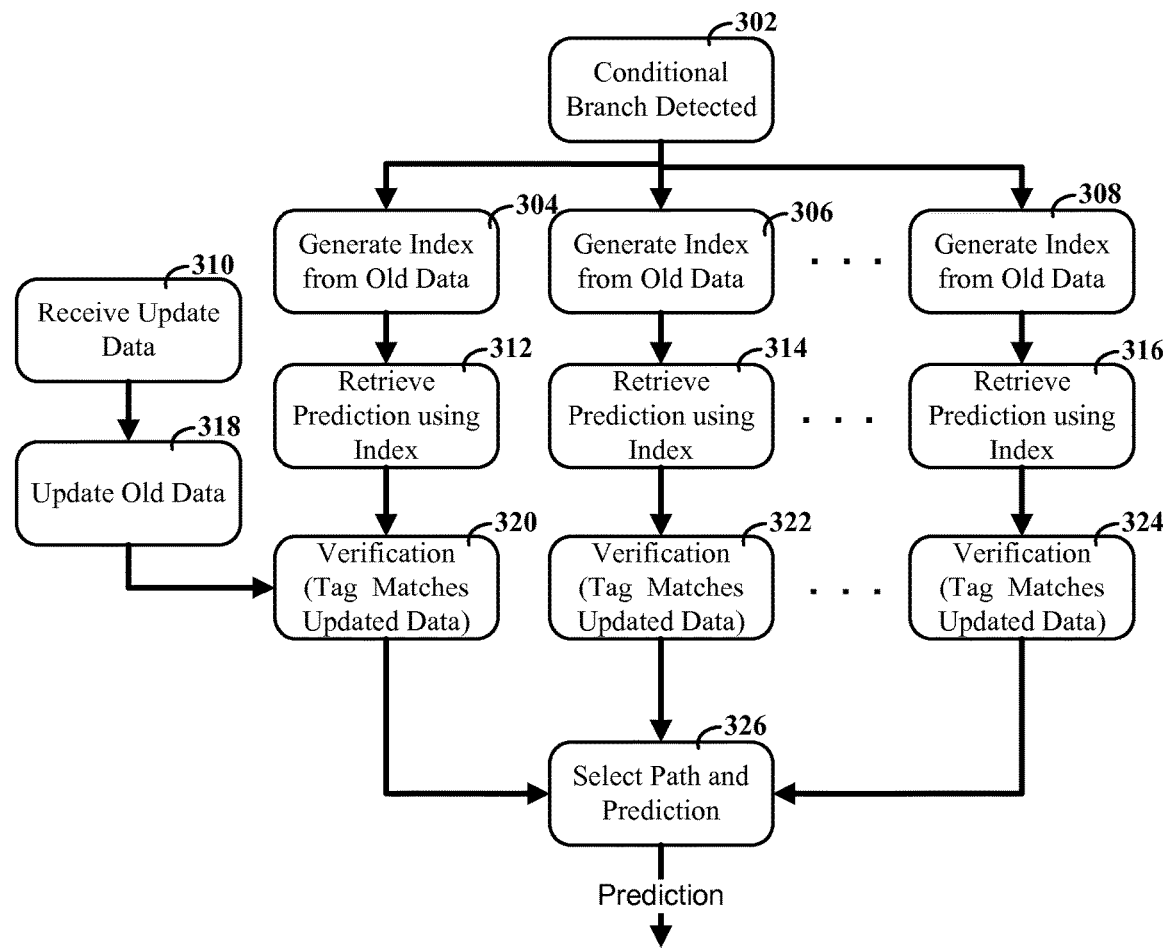
FIG. 3 depicts a flow diagram for generation of branch predictions, consistent with embodiments of the present disclosure.

FIG. 3 depicts a flow diagram for generation of branch predictions, consistent with embodiments of the present disclosure. The flow diagram shows a set of functions that can be carried out by logic units in a branch predictor circuit of a computer processor circuit, such as those depicted in FIGS. 1 and 2 and discussed herein.

At block 302, a conditional branch instruction can be detected. For instance, a branch scan logic unit can identify one or more conditional branch instructions. In response to a detected conditional branch instruction, a set of indexes can be generated using old data (e.g., GHV and PC data). These indexes can be generated for two or more prediction paths, as shown by blocks 304, 306, 308. As discussed herein, each prediction path can use a different history length for the old data. In particular embodiments, the different lengths correspond to a geometric series (e.g., $L(j)=\alpha^{j-1}L(1)$).

Based upon the generated indexes, branch prediction entries can be retrieved from predictor tables for the different prediction paths, per blocks 312, 314, 316. As discussed herein, the entries can include branch prediction information as well as a tag that can be used to verify that the branch prediction information matches the current branch prediction.

In various embodiments, the indexing shown in blocks 304, 306, 308 can begin before new data is available. Once the new data is received, per block 310, the branch predictor circuit can update the old data from the new data, per block 318. This updating can include updating the GHV and PC.

Using the information retrieved from each predictor table and the updated data, the branch predictor circuit can verify whether or not each path results in a hit or match, per blocks 320, 322, 324. For example, the branch predictor circuit can be configured to apply a hash algorithm to the updated GHV and PC (each of which can have different lengths for each path). The resulting hash value can then be compared against a tag from a corresponding predictor table.

The branch predictor circuit can then select between the retrieved predictions using the results of the verifications, as shown by block 326. For example, the branch predictor circuit can be configured to select between predictions that were verified by selecting the path that uses the longest history vector. A base prediction can also be generated and used as the default prediction (e.g., in the event that no other paths were verified).

Figure 4:
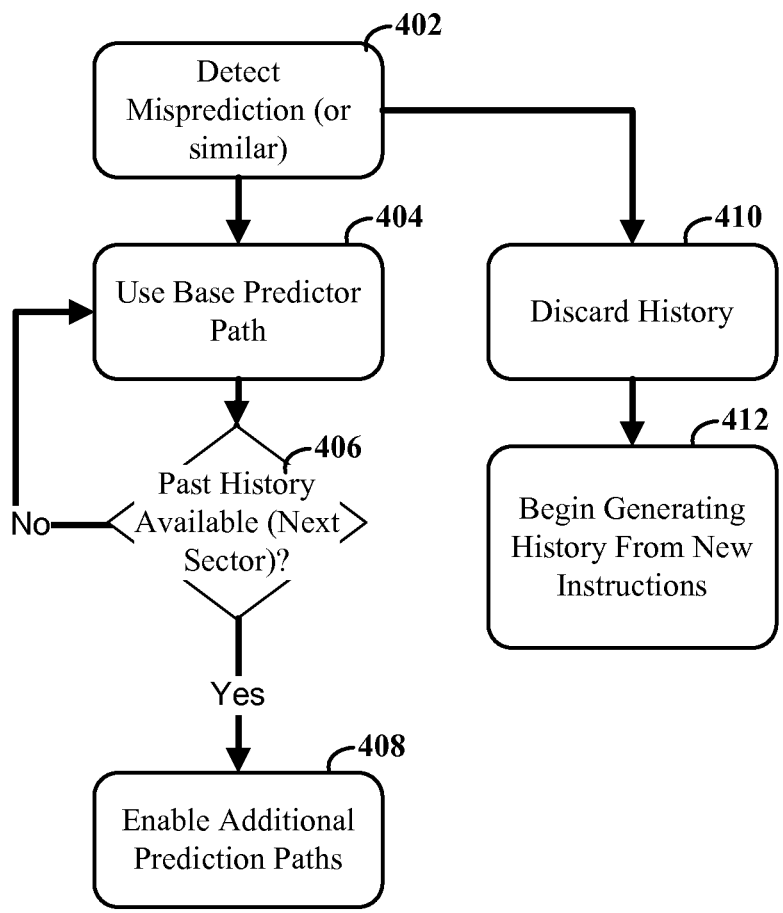
FIG. 4 depicts a flow diagram for a process of handling mispredictions by disabling tagged geometric length (TAGE) prediction, consistent with embodiments of the present disclosure.

FIG. 4 depicts a flow diagram for a process of handling mispredictions by disabling TAGE prediction, consistent with embodiments of the present disclosure. Certain processor related events may result in history data (e.g., the GHVs of varying lengths) being rendered undesirable for further use. For example, if the history data is based upon instructions that were pipelined but not fully-executed, then predictions based upon those instructions may become inaccurate. Examples of such events include, but are not necessarily limited to, branch mispredictions or pipeline flushes.

The process can begin when a misprediction (or similar) event is detected, per block 402. The existing history data can then be effectively discarded, per block 410. This can include marking the history data as invalid, overwriting the history data, not using the existing history data or combinations thereof. As new instructions are retrieved and processed, the system can begin generating new history data, per block 412.

Consistent with certain embodiments, the branch predictor circuit can be configured to effectively disable the portion of the circuit that relies upon the discarded history data, as shown in block 404. For example, prediction selection logic can be configured to only select a base prediction path, effectively disabling other (TAGE) prediction paths. The base prediction path can be used until it is determined that past history data has become available, per block 406. In certain embodiments, the circuit can be configured to enable the other prediction paths when new branch/instructions sector is reached, per block 408. For example, the processor circuit can be configured to update the GHV on a per sector basis (e.g., updating the GHV using prediction history for all branches in a particular sector). Accordingly, once a new sector is reached following a misprediction event, the GHV will subsequently be updated and the branch prediction again use both past and updated history again.

Figure 5:
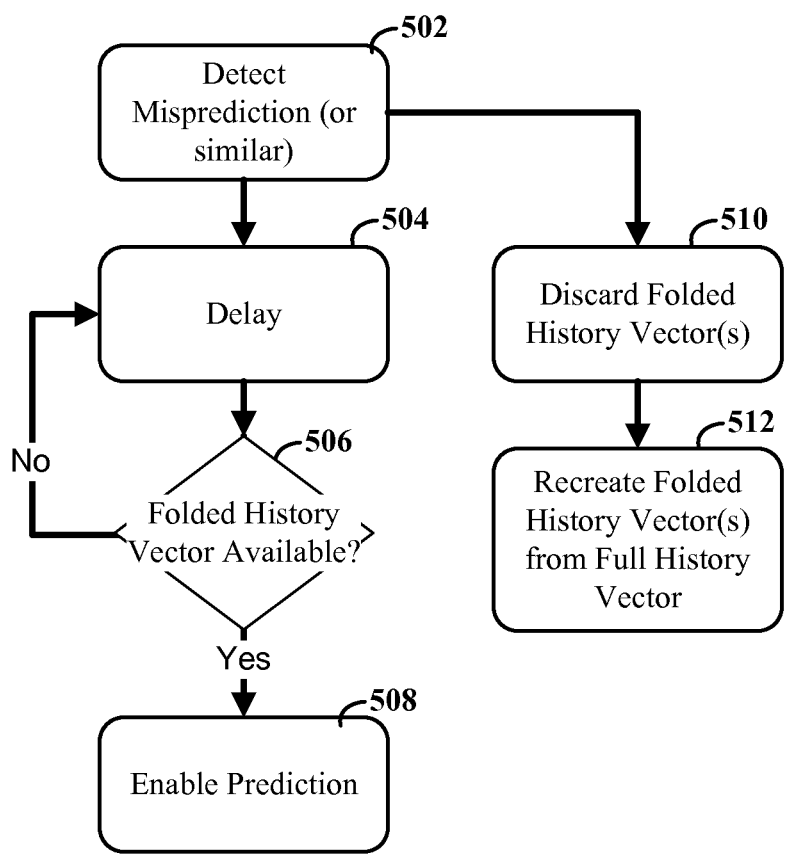
FIG. 5 depicts a flow diagram for a process of handling mispredictions by regenerating folded global history vectors (GHVs), consistent with embodiments of the present disclosure.

FIG. 5 depicts a flow diagram for a process of handling mispredictions by regenerating folded GHVs, consistent with embodiments of the present disclosure. The process can begin by detecting a misprediction (or similar) event, per block 502. The branch prediction circuit can then be halted or delayed, per block 504.

As discussed herein, the GHV's used by each prediction path can have different history lengths. In certain embodiments, bit length of the GHV can be reduced by folding the GHV. For example, a 20 bit history length can be folded into 8 bits using XOR logic. When a misprediction (or similar) event occurs the folded GHV may contain history from instructions that were not executed. However, by virtue of the folding process, this unwanted history may be difficult or impossible to remove from a fold GHV. Accordingly, the folded GHVs can be discarded, per block 510.

According to embodiments, the branch prediction circuit can be configured to store a full (unfolded) GHV. This unfolded GHV can be used to recreate the folded GHVs for the various paths, per block 512. This process may take several instruction cycles and the branch prediction circuit can be delayed until the folded GHVs become available, per block 506. As discussed herein, this may occur when a new branch sector is reached. Once the folded GHVs are available, the branch prediction circuit can be enabled, per block 508.

Figure 6:
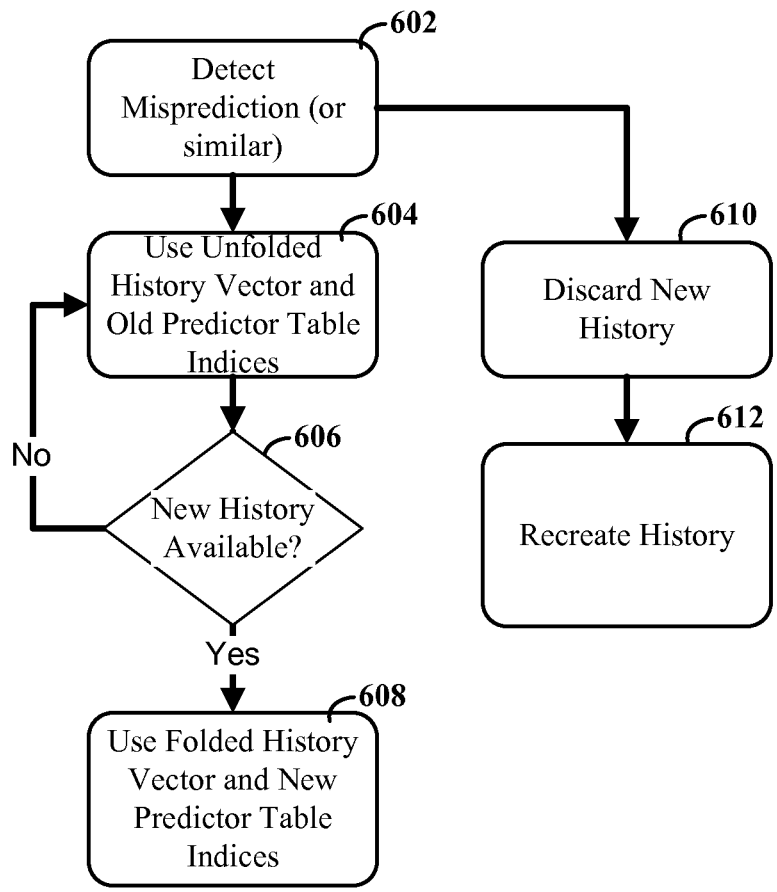
FIG. 6 depicts a flow diagram for a process of handling mispredictions by storing additional prediction data in the predictor tables, consistent with embodiments of the present disclosure.

FIG. 6 depicts a flow diagram for a process of handling mispredictions by storing additional prediction data in the predictor tables, consistent with embodiments of the present disclosure. The process begins when a misprediction (or similar) event is detected, per block 602. The most recent (new) history, in the form of folded GHVs and predictor tables, may no longer be acceptable due to the event. Accordingly, it can be discarded, per block 610. History can continue to be recreated as new instructions are executed, per block 612.

According to certain embodiments, the branch prediction circuit can be configured to store old prediction history data in the predictor tables. While this data storage may take additional memory, it can be used to roll back the prediction history data to a point before the branch misprediction. Moreover, the branch prediction circuit can be configured to maintain an unfolded version of the GHV, which can also be rolled back. Accordingly, the unfolded GHV and the old prediction history data can be used, per block 604. Once new history is available (e.g., a new branch sector is reached) the process can use the folded GHVs and the new predictor table entries/indices, per blocks 606 and 608.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for providing branch prediction for a current branch instruction, the method comprising:
generating a first index from a program counter and from a first branch history vector having a first length, wherein the first branch history vector is from a first instruction cycle, wherein the first instruction cycle occurs prior to a second instruction cycle, and wherein the second instruction cycle is the most-recent instruction cycle;
generating a second index from the program counter and from a second branch history vector having a second length that is longer than the first length and wherein the second branch history vector is from the first instruction cycle;
retrieving, using the first index, a first branch prediction for the current branch instruction from a first branch prediction table;
retrieving, using the second index, a second branch prediction for the current branch instruction from a second branch prediction table;
obtaining, after beginning to generate the first index, an updated first branch history vector and an updated second branch history vector, wherein the updated first branch history vector and second branch history vector are based upon additional branch history data from the second instruction cycle;
generating a first hash value from the program counter and the updated first branch history vector;
generating a second hash value from the program counter and the updated second branch history vector; and
selecting, prior to the resolution of the current branch instruction, between the first branch prediction and the second branch prediction based upon the first and second hash values.

2. The method of claim 1, further comprising:
generating a base branch prediction using branch prediction logic that does not use a branch history vector; and
wherein selecting between the first branch prediction and the second branch prediction further includes also selecting between the base branch prediction.

3. The method of claim 1, wherein selecting between the first branch prediction and the second branch prediction includes comparing a first tag from the first branch prediction table to the first hash value and comparing a second tag from the second branch prediction table to the second hash value.

4. The method of claim 1, wherein the first and second branch prediction tables are part of a tagged geometric length (TAGE) branch predictor.

5. The method of claim 4, further comprising:
detecting a branch misprediction event;

disabling, in response to detecting the branch misprediction event, the TAGE branch predictor;
updating, while the TAGE branch predictor is disabled, the first branch history vector and the second branch history vector; and
enabling, in response to the first branch history vector and the second branch history vector being updated, the TAGE branch predictor.

6. The method of claim 5, further comprising detecting that the first branch history vector and the second branch history vector have been updated by detecting that a new branch sector has been reached.

7. The method of claim 1, further comprising:
detecting a branch misprediction event;
recreating, in response to detecting the branch misprediction event, a previous version of the first branch history vector and a previous version of the second branch history vector; and
using the previous version of the first branch history vector and the second branch history vector to generate a subsequent branch prediction.

8. The method of claim 1, further comprising:
detecting a branch misprediction event;
retrieving, in response to detecting the branch misprediction event, a previous version of the first branch history vector and a previous version of the second branch history vector; and
using the previous version of the first branch history vector and the second branch history vector to generate a subsequent branch prediction.

9. The method of claim 1, wherein selecting between the first branch prediction and the second branch prediction based upon the first and second hash values includes selecting the branch prediction that includes a tag that matches the second hash value and that uses a longer branch history vector.

10. A branch prediction device for providing branch prediction for a current branch instruction, the device comprising:
a first branch prediction path including:
a first index generation circuit configured to generate a first index from a program counter and from a first branch history vector having a first length wherein the first branch history vector is from a first instruction cycle, wherein the first instruction cycle occurs prior to a second instruction cycle, and wherein the second instruction cycle is the most-recent instruction cycle;
a first branch prediction table that is configured to provide a first branch prediction for the current branch instruction and a first tag value based upon the first index;
a first verification circuit configured to:
generate a first hash value from the program counter and from an updated version of the first branch history vector, wherein the updated version of the first branch history vector is based upon additional branch history data from the second instruction cycle; and
verify the first branch prediction by comparing the first tag value to the first hash value;
a second branch prediction path including:
a second index generation circuit configured to generate a second index from the program counter and from a second branch history vector having a second length;
a second branch prediction table that is configured to provide a second branch prediction for the current branch instruction and a second tag value based upon the second index;
a second verification circuit configured to:
generate a second hash value from the program counter and from an updated version of the second branch history vector, wherein the updated version of the second branch history vector is based upon additional branch history data from the second instruction cycle; and
verify the second branch prediction by comparing the second tag value to the second hash value; and
a selection circuit configured to select between the first and second branch prediction paths in response to the first and second verification circuits and prior to the resolution of the current branch instruction.

11. The device of claim 10, further comprising a base prediction path configured to provide a base branch prediction.

12. The device of claim 11, wherein the selection circuit is further configured to select the base prediction path in response to other prediction paths not verifying a corresponding branch prediction.

13. The device of claim 10, wherein the first and second branch prediction paths are part of a tagged geometric length (TAGE) branch predictor.

14. The device of claim 13, further comprising logic configured to:
detect a branch misprediction event;
disable, in response to detecting the branch misprediction event, the TAGE branch predictor;
update, while the TAGE branch predictor is disabled, the first branch history vector and the second branch history vector; and
enable, in response to the first branch history vector and the second branch history vector being updated, the TAGE branch predictor.

15. The device of claim 14, further comprising logic configured to detect that the first branch history vector and the second branch history vector have been updated by detecting that a new branch sector has been reached.

16. The device of claim 10, further comprising logic configured to:
detect a branch misprediction event;
recreate, in response to detecting the branch misprediction event, a previous version of the first branch history vector and a previous version of the second branch history vector; and
use the previous versions of the first branch history vector and the second branch history vector to generate a subsequent branch prediction.

* * * * *